3,381,031
RESOLUTION OF RACEMIC AMINO ACIDS
Francis Patrick Dwyer, deceased, late of Griffith, New South Wales, Australia, by Lola Dwyer, executrix, Griffith, New South Wales, Australia, and Bert Halpern, Campbell, New South Wales, Australia, assignors to The Australian National University, Acton, Canberra, Australia, a body corporate, and Monsanto Chemicals (Australia) Limited, West Footscray, Victoria, Australia, a company of Victoria
No Drawing. Filed Apr. 12, 1963, Ser. No. 273,264
Claims priority, application Australia, Apr. 18, 1962, 16,783/62; Aug. 6, 1962, 20,694/62
9 Claims. (Cl. 260—518)

This invention relates to the resolution of racemic compounds selected from racemic acids, racemic bases, and racemic alcohols, and provides in particular a new and economical process for the resolution of racemic amino acids into their antipodes.

The active forms of the natural amino acids are required in an increasingl wide variety of investigations. Research workers have established that the dextro (d) and levo (l) forms of racemic amino acids are not always biologically equivalent; but studies concerned with the role of either optically active form often still employ the racemic form, because the active form in question is not otherwise readily available. Isolation of pure l-forms from protein hydrolysate is, with some exception, still difficult and uncertain. The pure d-forms are available only by racemization or synthesis, followed by resolution, or in some instances by biochemical processes.

A number of procedures exist for the separation of optical forms from a racemic modification. These are (i) mechanical separation of crystals; (ii) preferential crystallization due to inoculation or seeding with a suitable crystal form; and (iii) conversion to diastereoisomers. Methods (i) and (ii) have found useful application in only a few instances. In method (iii) a racemic modification is combined with some readily available optically active reagent and two diastereoisomeric forms result. This method relies on the fact that diastereoisomers have different physical properties, and may be separated by fractional crystallization.

The solution of racemic acids is one special example of diastereoisomer formation in which the racemic acid is converted to a diastereoisomeric derivative by reaction with a suitable optically active base. The racemic acid, convenientety written as $dlA$ is reacted with an optically active base, written as $d$-B or $l$-B and forms the diastereoisomeric pairs $dAdB$ and $lAdB$ or $dAlB$ and $lAlB$. The two disatereoisomeric forms which result may then be separated by fractional crystaiization. Such a base should have the properties of being readily synthesized from easily available starting materials; reacting with the racemic modifications in but one way; forming compounds with the racemic modification stable enough to resist dissociation or decompoistion on recrystallization, yet easily split after separation by methods not drastic enough to cause racemization; its diastereoisomeric derivatives must be crystallizable and less soluble than either of its components; it should have a rotary power of an order which will enable the progress of a resolution to be followed by polarimetric methods; and it should be readily recoverable for repeated use. The bases brucine, cinchonidine, cinchonine, morphine, quinine, styrchine, ephedrine, menthylamine, and the like have been used for the resolution of racemic acids.

This general method for obtaining both forms of optical isomers in pure state possesses some difficulties in practice. It is usually possible to isolate the less soluble of the diastereoisomeric pairs and then regenerate from it the optically pure acid. However the more soluble derivative remaining in the mother liquor is contaminated with a small amount of the less soluble material and it is therefore alway very difficult to obtain pure, since recrystallization is not very effective in removing small amounts of an insoluble material from as soluble material. Marckwald (Ber. 29, 43 (1896)) has pointed out that the salts $dA.lB$ and $lA.dB$ as well as $lA.lB$ and $dA.dB$ are enantiomorphic and possess the same solubility. Hence if an acid $(dlA)$ is reacted with an optically active base $(lB)$, the less soluble diastereoisomer (say $dA/B$) can be obtained pure. The partially resolved but impure acid, obtained from the more soluble diastereoisomer $(lA/B)$ can then be recombined with the optical antipode of the original active base $(dB)$. The enantiomorphic salt $(lAdB)$ is now less soluble than its diastereoisomer $(dAdB)$ and is the first to crystallize. In order to accomplish resolution by Marckwald's method it is necessary to have supplies of both $d$ and $l$ forms of the revolving base in the optically pure state. Hitherto, only very few such pairs are available, hence this method has had very little use.

In accordance with the present invention there is provided the process for the resolution of racemic compounds selected from racemic acids, racemic bases converted into acid derivatives, and racemic alcohols converted into acid derivatives, which process comprises forming in a suitable aqueous reaction medium at least one of the two possible diastereoisomeric salts by (A) reacting in said reaction medium an optically active metal complex salt with a salt of the racemic acid or with a salt of said acid derivative of the racemic compound, or by (B) reacting in said reaction medium an optically active metal complex hydroxide with the racemic acid or with said acid derivative of the racemic compound, the reaction components in either of such procedures being so selected that one of the two possible diastereoisomeric salts has a materially lower solubility than the other possible diastereoisomeric salt under the reaction conditions and also has a sufficiently low solubility in the reaction medium for ready separation therefrom; and recovering the desired diastereoisomeric salt from the reaction medium.

The process of the invention can be illustrated by the following equations, where the reaction components are in accordance with procedure (A) above:

EQUATION I

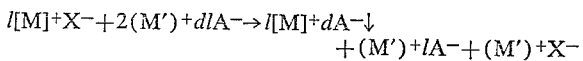

EQUATION II

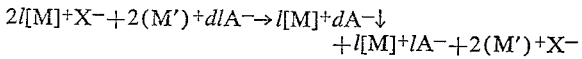

where $l[M]^+$ is the optically active complex metal cation, X is the anion associated with the complex metal cation, $dlA$ is the anion of the racemic amino acid derivative, and $(M')$ is the cation associated with the racemic amino acid derivative. The process of the invention can be illustrated by the following equations where the reaction components are in accordance with procedure (B) above:

EQUATION III $l[M]^+OH^-+2H^+dlA^- \rightarrow l[M]^+dA^-\downarrow+H^+lA^-+H_2O$

EQUATION IV

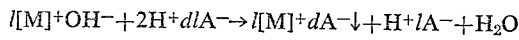

where $l[M]^+$ and $dlA$ are as defined above. In the case of racemic dicarboxylic acids, the less soluble diasteroisomeric salt which precipitates from the reaction of the optically active metal complex salt with the salt of the racemic acid is usually a compound in which both of the carboxylic groups are associated with the complex metal cation. From this it will be appreciated that the following equation will apply:

EQUATION V $$2l[M]^+X^- + (M')^+ dl\overline{OOCRCOO}(M')^+ \rightarrow$$
$$l[M]^+ d\text{OOCRCOO}[M]^+\downarrow + (M')^+$$
$$l\overline{OOCRCOO}(M')^+ + 2(M')^+X^-$$

wherein $l[M]^+$, $(M')$, and X are as defined above, and $dl\overline{OOCRCOO}$ represents the anion of the racemic dicarboxylic acid.

From Equations I, II, III, IV and V above, persons skilled in the art will appreciate that the reaction components and their amounts can be selected so as to form either one or both of the two possible diasteroisomeric salts, with the result that after separation of the less soluble diasteroisomeric salt, a solution remains containing the other optical isomer of the selected racemic acid or acid derivative of the racemic compound, either as a diastereoisomeric salt, or as the selected salt of the racemic acid or the selected salt of the acid derivative of the racemic compound, or as the free acid. This makes possible the recovery of either or both of the optically active isomers of the selected racemic compound.

Recovery of the desired isomer or isomers will vary accordingly. Thus, the less soluble diasteroisomeric salt after separation is reacted in a substantially aqueous reaction medium with a salt having an anion which will by double decomposition separate the optically active metal complex cation from the optically active acid anion as an insoluble salt of the optically active metal complex cation in the reaction medium, and optionally recovering from the reaction medium an optically active isomer of the racemic compound. Where a diastereoisomeric salt remains in solution, such salt may be isolated by any well known method, such as concentration, and the isolated salt subjected to double decomposition as described above; alternatively, such double decomposition may be effected in the original solution after isolation of said less soluble salt, however, isomers so obtained suffer with respect to optical purity. Where the separation of the less soluble diasteroisomeric salt leaves the other isomer in solution as the selected salt of the racemic acid or as the selected salt of the acid derivative of the racemic compound or as the free acid, such other isomer can be readily isolated by any well known method, such as precipitation, extraction, and the like.

In practice, resolution of a racemic compound in accordance with the invention is effected, where possible, by reacting the optically active metal complex salt with the salt of the racemic acid component to be resolved in proportions which will allow formation of only one of the two possible diasteroisomeric salts. The advantage of this procedure, apart from economy in consumption of the optically active metal complex salt, is that the other isomer remains in solution in a readily isolatable form. Where this procedure leads to difficulty in separation, due to unfavourable relative solubilities in the reaction system, then the specified reaction components can be reacted in proportions which will result in formation of the pair of diasteroisomeric salts. In this case the diastereoisomeric salt remaining in solution after separation of the less soluble of such salts is isolated as such and converted to the optical isomer as indicated above. Where, again, the inorganic salt formed as a by-product in the above reactions interferes with the ready separation of either of the diastereoisomeric salts due to its unfavourable solubility in the reaction system, then the optically active metal complex salt is converted to the free base, i.e., the hydroxide, conveniently by passing a solution of such salt through an anion exchange column in the hydroxyl form, and said hydroxide is reacted with the racemic amino acid derivative, in proportions to form either one or both of the disastereoisomeric salts. The hydroxide may be stabilized for storage conveniently by neutralizing the solution of said hydroxide with carbon dioxide and removing the water so that the carbonate salt remains, and may be used as such.

Resolution of racemic compounds including racemic hydroxy acids, racemic alcohols, and racemic bases (conversion of racemic alcohols into say carboxylic acid derivatives, e.g., the monophthalate ester or other suitable derivative provides an acid which can be resolved by the process herein, and conversion of racemic bases into say carboxylic acid derivatives, e.g. the monophthaloyl or other suitable derivative similarly provides a compound resolvable by the process herein) is contemplated by the invention, however, resolution of racemic amino acids is a primary object of the invention, and for this reason and for the sake of convenience, further description herein will be limited to the resolution of racemic amino acids. The racemic amino acids are utilized as derivatives, such as the acyl or sulphonyl derivative of the amino, hydroxyl, or mercapto group. The derivative is selected to lower the solubility of the diastereoisomeric salts in the reaction medium, which in conjunction with the optically active metal complex cation enables the preparation of diastereoisomeric salts which can be readily separated by conventional procedure.

Metal complexes which can be used for the purpose of this invention are those which are cations, and are resolvable into optical antipodes, and are otherwise stable under the reaction conditions of the process. The preferred metal complex cations are those which are readily resolvable to give both enantimorphs and which can be prepared easily from available starting materials. In any particular resolution, the final choice depends on the solubility properties of the two diastereoisomers formed. Most resolutions may be performed satisfactorily using a limited number of metal complex cations. The following cations have been found to be most useful:

Univalent cations (1) cis-Dinitrobis (ethylenediamine) cobalt (III) ion, which is given the short formula $[Co(en)_2(NO_2)_2]^+$ for the purpose of this specification;

(2) Oxalatobis (ethylenediamine) cobalt (III) ion, which is given the short formula $[Co(en)_2C_2O_4]^+$ for the purpose of this specification;

(3) Oxalatobis (ethylenediamine) chromium (III) ion, which is given the short formula $[Cr(en)_2C_2O_4]^+$ for the purpose of this specification;

(4) cis-Dinitro (triethylenetetramine) cobalt (III) ion, which is given the short formula $[Co(trien)(NO_2)_2]^+$ for the purpose of this specification;

(5) cis-Dinitrobis (1-propylenediamine) cobalt (III) ion, which is given the short formula
$$[Co\ 1\text{-}(pn)_2(NO_2)_2]^+$$
for the purpose of this specification; and (6) Oxalatobis (1-propylenediamine) cobalt (III) ion, which is given the short formula $[Co\ 1\text{-}(pn)_2C_2O_4]^+$ for the purpose of this specification.

Bivalent cations (1) Fluoro-, or chloro-, or nitro-, or thiocyanatoaminobis (ethylenediamine) cobalt (III) ions, which are given the short formula $[Co(en)_2NH_3X]^{2+}$ wherein X is F, Cl, Br, $NO_2$, or CNS, for the purpose of this specification; and (2) Trisphenanthroline nickel (II) ion, which is given the short formula $[Ni(phen)_3]^{2+}$ for the purpose of this specification.

Trivalent cations (1) Tris (ethylenediamine) cobalt (III) ion, which is given the short formula $[Co(en)_3]^{3+}$ for the purpose of this specification;

(2) Tris (1-propylenediamine) cobalt (III) ion, which is given the short formula $[Co\ 1\text{-}(pn)_3]^{3+}$ for the purpose of this specification; and (3) Aquo-aminobis (ethylenediamine) cobalt (II) ion, which is given the short formula [Co(en)$_2$H$_2$O·NH$_3$]$^{+++}$ for the purpose of this specification.

The anions with which the metal complex cations are associated preferably are so selected that the metal complex salt is more soluble than the diastereoisomers. Examples of the anions are acetate, nitrate, nitrite, and chloride. Methods for the preparation and resolution of optically active metal complex salts supplying the above-identified univalent, bivalent, and trivalent cations are set out hereafter. The term "metal complex" as used in this specification is to be understood as designating those stable compounds arising from the ability of metals or metal ions to combine with definite numbers of neutral molecules ions or groups (viz: Kirk Othmer, "Encyclopedia of Chemical Technology," vol. IV, p. 379 published 1949 by Interscience).

Examples of racemic amino acids which can be resolved in accordance with the invention are alanine, valine, leucine, iso-leucine, nor-leucine, phenylalanine, tyrosine, serine, cysteine, threonine, methionine, proline, aspartic acid, asparagine, glutamic acid, glutamine, ornithine, histidine, cystine, tryptophan, and $\beta$ or $\gamma$ or other substituted amino acids. With the simple amino acids, it is usually most convenient to make an N-substituted derivative, such as benzoyl, phthaloyl, p-nitrocarbobenzoxy, formyl, acetyl, p-toluene sulphonyl (tosyl), p-nitrobenzoyl, and the like. Where other functional groups are present, such as hydroxyl or mercapto it may be expedient to form a derivative of this other group, e.g., formyl, acetyl, benzoyl or tertiary butoxy in order to obtain a satisfactory resolution.

In the most convenient form of the process, a salt of the amino acid or its derivative soluble in the chosen reaction medium is prepared. The cation of this salt is selected so that the salt of the amino acid is more soluble than one of the diastereoisomers. Usually the sodium, potassium, lithium, or ammonium salts are used. In general, resolution of the parent racemic amino acids themselves cannot be performed using the complex metal cations since the diastereoisomers are almost always too soluble and will only precipitate from very high concentrations, however, conversion of the amino acids to suitable substituted derivatives modifies the solubilities of the diastereoisomers sufficiently to cause precipitation of the less soluble isomer from moderate concentrations. Hence, by the choice of a suitable derivative, the process of the invention is applicable to all types of amino acids.

Water has been found in most cases to be a suitable reaction medium or solvent in carrying out the process of the invention, a suitable metal complex cation and amino acid derivative being chosen which enables resolution in water to be carried out satisfactorily. In some cases, however, a water miscible organic solvent may be added to improve the separation, in some instances the organic solvent being in preponderance. Usually the metal complex salt is dissolved in a minimum of water in order to avoid subsequent evaporation, and temperatures up to 60° C. may be used in order to effect solution. Above this temperature some racemization of the resolving agent may occur. The amino acid or its derivative is usually dissolved or slurried in water and neutralized with a suitable base. The amount of water again is usually kept to a minimum to avoid subsequent evaporation but in any particular resolution, the total reaction volume used is decided accordingly to the solubility of the desired diastereoisomer salt in relation to the solubilities of the other reaction components and being chosen so that the less soluble isomer is precipitated in the desired purity.

The two solutions are mixed in any convenient manner. In some cases it may even be convenient to add solid metal complex salt to a solution of a salt of the amino acid or its derivative or vice versa. Crystallization of the less soluble isomer usually occurs spontaneously but is sometimes hastened by seeding or scratching. Precipitation is usually complete within a short time, but may be allowed to proceed for longer periods without contamination of the precipitate occurring. The product may be separated by the usual methods and it is usually desirable to wash the product with a solvent in which it is insoluble such as acetone, alcohol, ether, and the like. If required the diastereoisomer may be recrystallized from a suitable solvent. In most cases water is satisfactory but concentration of the solution may be required in order to obtain a satisfactory recovery.

Recovery of the amino acid or its derivative is most expediently effected by dissolving or slurring the diastereoisomer in water and adding a suitable salt or solution of a suitable salt to the mixture. The salt to be added is one which has an acid radical which will form an insoluble salt with the metal complex cation. Examples are iodides, bromides, and perchlorates, such as potassium or sodium iodide or bromide, or ammonium perchlorate. The complex metal cation is thus precipitated and can be removed by the usual methods such as filtration, leaving the salt of the resolved amino acid or its derivative in solution. The amino acid or its derivative is then obtained from the solution of its salt by any of the usual methods known to those experienced in the art. If the compound is insoluble in acid solution then acidification of the solution will precipitate the compound which can be filtered off. In other cases extraction or other methods would be employed.

For most uses, the amino acid or its derivative obtained is satisfactorily pure optically, judged by polarimetric measurements. If desired, however, it may be purified further by recrystalization, reprecipitation and similar methods. It only remains, in the case of an amino acid derivative, to convert the product to the amino acid by methods well known in the literature. Normally the amino acid, when tested for optical purity by enzymatic means, is found to be pure.

In order to obtain the enantiomorph, the procedure as above may be carried out using the opposite resolving agent (the antipode), when the diastereoisomer of the enantiomorph will now be the less soluble in the reaction medium. This is the preferred method when only the one isomer is required, since it is obtained in a state of high purity. When both isomers are required, they are best obtained in one step by treating the mother liquor, after separation of the less soluble diastereoisomer, in the manner outlined below. However, the more soluble isomer is not obtained in such a high state of purity as readily as the less soluble isomer. In the case where only one of the two possible diastereoisomeric salts is formed in the reaction system, the isomer of the racemic acid which remains in solution as a simple salt, such as the sodium or potassium salt, may be readily separated by precipitation, extraction, or other conventional procedure, and purified if desired. When both the diastereoisomeric salts are formed in the reaction system, the more soluble isomer is obtained after removal of the less soluble diastereoisomeric salt by concentrating the mother liquor until a sufficient quantity of the more soluble isomer has crystallized. This is usually carried out at reduced pressure in order to avoid racemization. The impure product is separated, usually by filtration. At this stage, purification by recrystallization is desirable and water may be used in most cases. The impure product is dissolved and then concentrated so that any of the unwanted diastereoisomer (the one that is less soluble) is precipitated. This unwanted isomer is then removed, usually by filtration, and the filtrate is treated with a salt which will precipitate the complex metal cation as described previously. Recovery of the amino acid or its derivative and conversion of the derivative to the amino acid is carried out as described previously. As a further alternative, the impure diastereoisomer isolated from the mother liquor may be converted immediately to the amino acid or its derivative and obtained optically pure by applying Marckwald's method as described previously.

The invention is illustrated in the following practical examples which, however, are not to be construed as limitative in any manner whatsoever:

EXAMPLE I 2.21 gm. of racemic N-benzoyl valine were placed in a flask and to this was added a solution of 0.56 gm. of potassium hydroxide in 30 ml. of water. The temperature of this solution was maintained below 45° C. 3.3 gm. of $l$ [Co(en)$_2$(NO$_2$)$_2$]$^+$CH$_3$COO$^-$ dissolved in 30 ml. of water was added to this solution. After addition the resulting solution was cooled to a temperature of 5–10° C. whereupon the diastereoisomeric salt, which for convenience is identified as benzoyl-d-valine-$l$ [Co(en)$_2$(NO$_2$)$_2$], crystallized in the form of yellow needles. The resulting mixture was filtered to remove the crystals. The crystals were washed with acetone and dried at room temperature. 1.8 g.m of dry crystals were thus obtained.

1.8 gm. of the above identified diastereo-isomeric salt were placed in a flask and to this was added a solution of 1 gm. of potassium iodide in 5 ml. of water. The temperature of this mixture was maintained below 45° C. and the reaction mixture was stirred vigorously for 30 mins. The suspension was cooled to 5–10°; whereupon $l$ $$[Co(en)_2(NO_2)_2]I^-$$

crystallized in the form of yellow brown needles. The resulting mixture was filtered to remove the crystals. The filtrate obtained after removal of the crystals was neutralized by the addition of dilute hydrochloric acid and the solution was carbon treated and finally filtered. The filtrate was acidified with dilute hydrochloric acid to a pH 4 whereupon benzoyl-d-valine crystallized in the form of white needles. After recrystallization from benzene the crystals melted at 134–135° C. $[\alpha]_D = -51°$ (1.04% in chloroform).

EXAMPLE II 3.51 gm. of $l$ [Co(en)$_2$(NO$_2$)$_2$] Br was suspended in 10 ml. of H$_2$O and 1.67 gm. of silver acetate was added to the mixture. The reaction mixture was shaken vigorously for 15 minutes and the precipitated silver bromide was filtered off. The filtrate and washings (15 ml.) were added to a solution of the potassium salt of racemic phthaloyl leucine (prepared by suspending 2.61 gm. in 30 ml. of H$_2$O and neutralizing with potassium hydroxide).

The resulting solution was then cooled to a temperature of 5–10° C., whereupon the diastereoisomeric salt, which for convenience is identified as phthaloyl d-leucine-$l$ [Co(en)$_2$(NO$_2$)$_2$], crystallized in the form of yellow needles. The resulting mixture was filtered to remove the crystals. The crystals were washed with acetone and dried at room temperature, 2.3 gm. of dry crystals were thus obtained.

The crystalline product was suspended in 5 ml. water and 2 gm. of potassium iodide was added with vigorous stirring. The mixture was maintained at 15° C. for 30 minutes and then cooled to 10° C. whereupon $l$

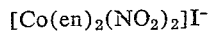
[Co(en)$_2$(NO$_2$)$_2$]I crystallized in the form of yellow brown needles. The resulting mixture was filtered to remove the crystals. The filtrate obtained after removal of the crystals was acidified with dilute hydrochloric acid to a pH 4, whereupon phthaloyl-d-leucine crystallized in the form of white needles $[\alpha]_D +22.8$ (in ethanol).

EXAMPLE III 2.59 gm. of racemic N-tosyl serine were dissolved in a solution of 0.4 gm. of potassium hydroxide in 30 ml. of water. The temperature of this solution was maintained below 45° C. 3.3 gm. of $l$ [Co(en)$_2$(NO$_2$)$_2$]$^+$ CH$_3$COO$^-$ dissolved in 10 ml. of water was added to this solution. After addition the resulting solution was cooled to a temperature of 5–10° C. whereupon the diastereoisomeric salt, identified as p-tosyl-d-serine-$l$ [Co(en)$_2$(NO$_2$)$_2$] 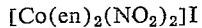 crystallized in form of pale yellow needles. The resulting slurry was filtered to remove the crystals and the crystals were washed with acetone and dried at room temperature.

The diastereoisomeric salt so obtained was slurried in a solution of 1.5 gm. of potassium bromide in 5 ml. of water for 30 mins. The suspension was cooled to 5° C. whereupon $l$ [Co(en)$_2$(NO$_2$)$_2$] Br crystallized in the form of yellow brown needles. The filtrate obtained after removal of the crystals was acidified to a pH 4 by the addition of dilute hydrochloric acid, whereupon p-tosyl-d-serine crystallized. After recrystallization from methanol the crystals melted at 230–232°. $[\alpha]_D^{20} = 12°$. A 0.4% in ethanol).

EXAMPLE IV

A column of 80 ml. of anion exchange resin (Dowex 1 or Deacidite FF) was converted to the hydroxy form by passing a 3% sodium hydroxide solution through the bed and then washing the bed with distilled water until the effluent was only faintly alkaline. A solution of $l$-[Co(en)$_2$(NO$_2$)$_2$] Br. (12.75 g.) in water (1387 ml.) was passed through the column, the effluent being checked occasionally for the presence of bromide ion. $dl$ Tosyl serine was added to effluent until the solution was neutral and the solution was then evaporated until a crystalline crop was obtained. This was converted to $d$-tosyl serine as described in Example III. The product had a rotation of $[\alpha]_D = +12$ (0.4% in ethanol).

EXAMPLE V 17.5 g. of $l$-[Co(en)$_2$(NO$_2$)$_2$]$^+$Br$^-$ was slurried in 100 ml. warm water and 8.35 g. silver acetate was added. After shaking vigorously, the precipitated silver bromide was filtered off and washed. The filtrate and washings were added to a solution of the potassium salt of racemic phthaloyl α-alanine (prepared by suspending 11.0 g. phthalolyl-α-alanine in 50 ml. water and neutralizing with potassium hydroxide solution) and the volume adjusted to 200 ml. Upon scratching the diastereoisomeric salt identified as $l$-[Co(en)$_2$(NO$_2$)$_2$] $d$-o-carboxybenzoyl-α-alanine crystallized out, which was cooled to 5–10° C. and filtered to give 6.2 g. of dry product.

This salt was recrystallized by dissolving in water and evaporating to a small bulk. The mother liquor was kept. The original reaction liquor was then concentrated to a small volume and the crystals of impure $l$-[Co(en)$_2$(NO$_2$)$_2$]

$l$-o-carboxybenzoyl-α-alanine filtered off to give 12 g. of dry product. This was dissolved in the mother liquor retained from the above together with some water and concentrated to give a crop of impure $l$-[Co(en)$_2$(NO$_2$)$_2$] $l$-o-carboxybenzoyl-α-alanine and the mother liquor was treated with potassium iodide to precipitate the resolving agent, leaving a solution of $l$-o-carboxybenzoyl-α-alanine as its potassium salt; acidification with concentrated hydrochloric acid gave the free acid.

The 6.2 g. of $l$-[Co(en)$_2$(NO$_2$)$_2$] $d$-o-carboxybenzoyl-α-alanine was slurried in 10 ml. of water and solid potassium iodide added to precipitate the resolving agent and $d$-o-carboxybenzoyl-α-alanine was recovered from the filtrate by acidification. Each isomer was recrystallized from aqueous ethanol to give crystals melting at 146° C. Rotations were:

$d$-o-carboxybenzoyl-α-alanine $[\alpha]_D = -24°$
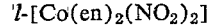
(0.5% in N NaOH)

$l$-o-carboxybenzoyl-α-alanine $[\alpha]_D = +26°$
(0.5% in N NaOH)

EXAMPLE VI 35 gm. of $d$-[Co(en)$_2$(NO$_2$)$_2$]$^+$Br$^-$ was slurried in 200 ml. warm water and 16.7 gm. silver acetate was added. After shaking vigorously, the precipitated silver bromide was filtered off and washed. The filtrate and washings were added to a solution of the potassium salt of racemic phthaloyl-phenylalanine (prepared by suspending 29.5 gm. phthaloyl phenylalanine in 100 ml. water and neutralizing with potassium hydroxide solution) and the volume was adjusted to 600 ml. Upon scratching, the diastereoisomeric salt identified as $d$-[Co(en)$_2$(NO$_2$)$_2$] $l$-o-carboxybenzoyl phenylalanine crystallized out, which was cooled to 5–10° C. and filtered to give 26 gm. of dry product.

This salt was recrystallized by dissolving in water and evaporating to a small bulk. The mother liquor was kept. The original reaction liquor was then concentrated to a small volume and the crystals of impure $$d\text{-[Co(en)}_2\text{(NO}_2\text{)}_2\text{]}$$

$d$-o-carboxybenzoyl phenylalanine filtered off to give 28 gm. of dry product. This was dissolved in the mother liquor retained from the above together with some water and concentrated to give a crop of impure $$d\text{-[Co(en)}_2\text{(NO}_2\text{)}_2\text{]}$$

$d$-o-carboxybenzoyl phenylalanine. The mother liquor was treated with potassium iodide to precipitate the resolving agent, leaving a solution of $d$-o-carboxybenzoyl phenylalanine as its potassium salt, which on acidification with concentrated hydrochloric acid gave the free acid.

The 26 g. of $d$-[Co(en)$_2$(NO$_2$)$_2$] $l$-o-carboxybenzoyl-phenylalanine was slurried in 100 ml. water and solid potassium iodide added to precipitate the resolving agent and $l$-o-carboxybenzoyl phenylalanine was recovered from the filtrate by acidification. Each isomer was recrystallized from aqueous ethanol. Rotations were:

$l$-o-carboxybenzoyl-phenylalanine $[\alpha]_D = -212°$
(0.5% in ethanol)

impure $d$-o-carboxybenzoyl-phenylalanine $[\alpha]_D = +192°$
(0.5% in ethanol)

EXAMPLE VII 1.8 g. of $d$-[Co(en)$_2$(NO$_2$)$_2$]$^+$Br$^-$ and 0.9 g. of silver acetate were shaken vigorously in 15 ml. of warm water and the precipitated silver bromide was filtered off and washed. The filtrate and washings were added to a solution of the sodium salt of racemic phthaloyl glutamic acid (prepared by heating 1.4 g. phthaloyl glutamic acid in 20 ml. water to 80° C. and adding 0.84 g. sodium carbonate). The solution was concentrated to 25 ml. and diluted with alcohol to a volume of 220 ml. From the mixture 1.2 g. of the diastereoisomer identified as $$(d\text{-[Co(en)}_2\text{(NO}_2\text{)}_2\text{]})_2$$

$l$-phthaloyl-glutamic was filtered off and recrystallized from aqueous alcohol to yield 0.8 g. of the pure diastereoisomer. The compound was treated with potassium iodide as before. The mother liquor after removal of the precipitated complex was acidified and extracted with chloroform. Removal of the chloroform yielded phthaloyl-$l$-glutamic acid $[\alpha]_D$ $-45.3°$ (in ethanol).

EXAMPLE VIII

The procedure of Example VII was followed starting with 1.48 g. of bis formyl cystine to give 1.1 g. of recrystallized $(d$-[Co(en)$_2$(NO$_2$)$_2$])$_2$ $l$-bis formyl cystine. This yielded bis formyl-$l$-cystine $[\alpha]_D$ $-162°$ (1% in N NaOH).

EXAMPLE IX

The procedure of Example VII was followed starting with 2.1 g. of formyl tyrosine but using one equivalent of resolving agent to give 1.7 g. of $d$-[Co(en)$_2$(NO$_2$)$_2$] $l$ formyl tyrosine. This yielded formyl tyrosine having a rotation $[\alpha]_D = -80°$ (in ethanol).

EXAMPLE X 3.47 g. (0.1 mol.) of $d$-oxalatobis (ethylenediamine) cobalt (III) bromide suspended in water (250 ml.) at 20° C. was shaken with silver oxide (prepared from silver nitrate, (17.0 g., 0.1 mol.) and sodium hydroxide, (4.2 g.)). After reaction was complete, the silver bromide was filtered off and washed with water. $d,l$-Benzoyl-alanine (19.3 g.) was added to the red filtrate (volume 300 ml.) and the mixture stirred until dissolved. The neutral or slightly acid filtrate was concentrated at a temperature not more than 50° C. to a volume of 140 ml. and allowed to stand at 20° C. for 24 hours.

The crystalline diastereoisomer (16.5 g.) was removed washed with cold (10° C.) 80° aqueous-acetone, then acetone, the filtrate being retained. The solid was recrystallized by rapid dissolution in water at 85–90° C. and then cooled quickly to 5° C. The solid after washing with cold 80% aqueous-ethanol was air-dried. It was dissolved in warm water (200 ml.) and potassium bromide (20 g.) added. After cooling to 4° C. the $d$-[Co(en)$_2$C$_2$O$_4$] Br was recovered. Addition of hydrochloric acid (10 N, 10 ml.) caused the $l$-benzoyl-alanine to crystallize. The specific rotation $[\alpha]_D$ was $-35°$ (0.125 g. in 1 N NaOH, 2 dm. tube).

The filtrate referred to above was reduced in volume to 100 ml. in a current of air at 45° and the acetone from the washings was also lost in the process. The $d$-[Co(en)$_2$C$_2$O$_4$] Br was recovered as before by adding potassium bromide (20 g.) and cooling, and finally the partly resolved $d$-benzoylalanine was transformed to the salt of the $l$-oxalato-bis(ethylenediamine) cobalt (III) cation through the [Co(en)$_2$C$_2$O$_4$] OH as above. After concentration of the aqueous solution, the diastereoisomer was allowed to crystallize, and then recrystallized from hot water. The cation $l$-[Co(en)$_2$C$_2$O$_4$]$^+$ was recovered as the bromide, and the $d$-benzoylalanine caused to crystallize by adding hydrochloric acid. This material gave $[\alpha]_D = +35°$.

Hydrolysis of $d$ and $l$ benzoylalanine was effected as described in the literature. 2.92 gm. of $d$ or $l$ benzoyl-alanine were suspended in 14½ ml. 6NHCl and heated for 4½ hours on the steam bath. The reaction mixture was cooled overnight in the refrigerator and 10 ml. H$_2$O was then added and the benzoic acid filtered off. The acid filtrate was evaporated to dryness in vacuo and 3 ml. water was then added and the benzoic acid filtered off. To the filtrate (4 ml.), 1 cc. ammonia solution and 3 ml. 95% ethanol were added, and the suspension filtered after cooling to 0° C. The alanine crystals were then washed free of chloride ion with 95% ethanol and dried at 50° C. in vacuo. In this way $l$-alanine M.P. 297° $[\alpha]_D^{25}$+15° (0.5% in 6NHCl) and $d$-alanine $[\alpha]_D^{25}$ $-15°$ (0.5% in 6NHCl) were obtained.

Biochemical assay was carried out by the method described by J. P. Greenstein, Methods in Enzymology, Academic Press, New York, 1957 vol. III, p. 554. The amino acid oxidase was prepared by the method of Negelin and Bromel (Biochem. Z., 300, 225 (1939)). The alanine $[\alpha]_D = +15°$ (or absolute L configuration) contained less than one part in five hundred of the D antipode. This is the limit of the method as applied.

Thus, the process of the invention will be seen to involve the addition of a solution of a salt of an optically active metal complex cation having a suitable anion to a solution of a suitable racemic amino acid derivative, and thereafter filtering off the diastereoisomeric salt, recrystallizing if desired, precipitating the optically active complex cation by double decomposition of the compound, and recovering the amino acid derivative in an optically active form. Furthermore, the mother liquor from which the less soluble diastereoisomer is removed, may be treated to obtain the more soluble isomer from which the enantiomorphic amino acid derivative is recovered, usually in a less pure state, by similar methods to those described above.

Advantages of the invention are that the preferred optically active complexes are readily synthesized from easily available starting materials, and, both stereoisomeric forms can be obtained in a single preparation; water is the preferred solvent whereas in previous methods, organic solvents are usually used; the diastereoisomeric salts are well defined crystalline compounds, which crystallized rapidly from solution, whereas by previous methods long periods of crystallization are necessary; the diastereoisomeric pairs have the indicated widely different solubilities, as a result of which sharp separation of the isomers are obtained, in most cases the less soluble diastereoisomer obtained being optically pure without further treatment; and the recovery of the optically active acid involves the separation of an inorganic type of cation from an organic compound and the large difference in properties makes an exceedingly simple practical separation.

Amino acids obtained by the process of this invention have outstanding optical purity as demonstrated by the inability to detect optical impurity by enzymatic methods. Since it has been established that many amino acids meet the needs of growth only in the stereochemically natural form, examples of which are valine, leucine, iso-leucine, lysine and threonine, this process is of considerable value both scientifically and commercially. Since synthetic methods are widely known for the synthesis of most of the racemic amino acids, it now becomes possible to synthesize these amino acids in their natural and unnatural optical forms wholly synthetically.

Methods for the preparation and resolution of optically active metal complex salts, utilized in accordance with the invention for supplying the univalent, bivalent and trivalent cations listed above, are as follows:

Univalent cations (1) cis-Dinitrobis (ethylenediamine) cobalt (III) ion can be provided by the chloride salt, which is prepared as described by Busch & Morris, J.A.C.S. 82, 1521, 1960. Thus, a mixture of 6.85 g. of 70% ethylene diamine and 10 ml. of water is partially neutralized by the addition of 4 ml. of conc. hydrochloric acid. The resulting solution is added to a solution of 9.52 g. of cobalt (III) chloride 6-hydrate and 6.0 g. of sodium nitrite in 10 ml. of water. A stream of air is vigorously drawn through the solution. The yellow cis-dinitrobis (ethylenediamine) cobalt (III) chloride begins to precipitate in a few minutes and the reaction is allowed to proceed for one hour. The mixture is cooled in an ice-salt bath, filtered, and the product recrystallized from hot water and dried in air.

The resolution is carried out by dissolving 12 g. of the $d\ l$ salt in 50 ml. of water at 60° with vigorous shaking. A solution of potassium antimonyl $d$-tartrate (7 gm. in 40 ml. $H_2O$) kept at 75° C. is added rapidly to the above solution. The mixture is then cooled immediately to 25° C. and the $l$-[Co(en)$_2$(NO$_2$)$_2$]SbO $d$ C$_4$H$_4$O$_6$ [I] separated. Yield 6.4 g. The mother liquor from above was treated with ammonium bromide (2 g.) and the precipitated $d$-[Co(en)$_2$(NO$_2$)$_2$]Br filtered off. Yield 5 g. [α]$_D$=+43°. The $l$ isomer was obtained from the diastereoisomer [I] as the bromide by dissolving 6 g. of [I] in a solution of KOH in water [3.5 g. in 100 ml.] and adding 4 g. of NaBr. The precipitate was filtered off and washed with a little water to yield 3.4 g. of $l$-[Co(en)$_2$(NO$_2$)$_2$]Br

[α]$_D$=−43°.

(2) Oxalatobis (ethylenediamine) cobalt (III) ion, can be provided in accordance with the following: Calcium bis (oxalato)-ethylenediamine cobaltate (III), 4-hydrate was prepared by adding a solution of cobalt (II) acetate (10 g.) in water (50 ml.) to a hot solution of potassium oxalate (25 g.) in hot water (50 ml., 80°) and ethylenediamine di-hydrochloride (5.76 g.) then dissolved in the deep red solution. The mixture was stirred mechanically while being heated to boiling, lead (IV) oxide (25 g.) added gradually and boiled for a further 0.5 hr. The hot solution which had become alkaline, was filtered, diluted to 200 ml. with water and oxalic acid (9 g.) added gradually. After boiling for a further 15 min. the solution was cooled to room temperature, and sufficient hydrochloric acid (10 N) added to make it approximately 2 N. Calcium chloride 6-hydrate (25 g.) in a little cold water was added, the sides of the vessel scratched with a glass rod and crystallization allowed to proceed for five minutes. Longer crystallization times caused such calcium oxalate to separate. The dark purplish-red crystalline powder was washed with normal hydrochloric acid and alcohol and further freed from calcium oxalate by suspending in normal hydrochloric acid (25 ml. at 40°) and filtering while warm. After washing with warm normal hydrochloric acid, water, alcohol and finally acetone, the solid was dried (yield, 8.6 g., 60%).

$d$-Sodium bis-(oxalato)-ethylenediamine-cobaltate (III) $l$-hydrate: The calcium salt (14.1 g.) was added to a mechanically stirred solution at 50–55° of $d$-cis-dinitrobis-ethylenediamine-cobalt (III) oxalate (14.1 g.) from $d$-[Co(en)$_2$(NO$_2$)$_2$] Br (16.5 g.), and silver oxalate (6.8 g.), and the stirring continued for 0.5 hr. The calcium oxalate was removed and to the filtrate, containing $d$-[Co(en)$_2$(NO$_2$)$_2$] $d$-[Co(en)(C$_2$O$_4$)$_2$] (2 moles), was added sodium bis-(oxalato)-ethylenediaminecobaltate (III) (13.86 g., 2 moles). The mixture was then maintained at 50–55° whilst being stirred for 15–20 min. and then filtered hot. The purplish-brown precipitate of the diastereoisomer $d$-[Co(en)$_2$(NO$_2$)$_2$] $l$-[Co(en)(C$_2$O$_4$)$_2$] (7.2 g.) was reserved and subsequent fractions (5) caused to crystallize by gradual evaporation at 50° in a stream of air. All of these fractions were levo-rotatary and contained the diastereoisomer $d$-[Co(en)$_2$(NO$_2$)$_2$]

$l$-[Co(en)(C$_2$O$_4$)$_2$]

When the volume had been reduced to about 100 ml., the solution was chilled, filtered and the remainder of the resolving agent recovered by the addition of sodium iodide (8.0 g.). The precipitate of $d$-[Co(en)$_2$(NO$_2$)$_2$] I was removed and ethanol (300 ml.) added to the filtrate when $dl$-Na[Co(en)(C$_2$O$_4$)$_2$] was recovered. The dextro diastereoisomer (fraction I) was converted to the sodium salt by grinding in a mortar with warm 20% sodium iodide (30 ml.) and filtering off the insoluble iodide of the resolving agent. The active salt crystallized on the addition of ethanol and was recrystallized to constant rotation from aqueous ethanol. Unlike the racemic form, the optically active calcium salt was quite soluble in cold water but the lead salt could be recrystallized from hot water.

$l$-Sodium bis-(oxalato)-ethylenediamine-cobaltate (III) $l$-hydrate.—The levo-rotatory diastereoisomeric fractions above were combined and recrystallized by dissolution in the minimum volume of water at 60° and then standing at room temperature for two days. Further fractions were obtained by concentration at 50° in a stream of air. The less soluble (most active) fractions were recrystallized as before to yield the pure diastereoisomer, from which the sodium salt was obtained in the same manner as the dextro isomer above. A 0.02% solution gave [α]$_D$−500°.

(3) Oxalatobis (ethylenediamine) chromium (III) ion can be provided by the chloride salt. A solution containing K$_3$[Cr(C$_2$O$_4$)$_3$], 3H$_2$O (100 g.) and ethylenediamine hydrate (32 g.) in water (240 cc.) was gently heated until the deep pink complex salt began to form, and was then allowed to cool; yield, 35–45 g. This was ground into a thin paste with concentrated hydrochloric acid (40 cc.) and mechanically stirred for 10 minutes, absolute alcohol (20 cc.) then being gradually added, and a similar addition being made again after a further 5 hours stirring. The residue was filtered off, washed with concentrated hydrochloric acid and then with absolute alcohol, and purified by recrystallization from hot water (60°); yield 10 g.

Resolution of [Cr(en)₂C₂O₄]⁺ was carried out in the same manner as the cobalt complex cation

[Co(en)₂C₂O₄]⁺

(4) cis-Dinitro (triethylenetetramine) cobalt (III) ion can be provided by the iodide salt. The $d,l$ salt is prepared in the manner as [Co(en)₂(NO₂)₂]Cl, using triethylenetetramine (1 mol) instead of ethylenediamine, (2 mol), as described by Busch and Morris (J. Amer. Chem. Soc., 82, 1521, 1960). When oxidation is complete, the substance is precipitated as the iodide by adding potassium iodide. The resolution is performed with either potassium antimonyl tartrate, or potassium ethylenediamine bis (oxalato) cobaltate (III).

(5) cis-Dinitrobis - (1-propylenediamine) cobalt (III) can be provided as the chloride salt. This is prepared in the same manner as the ethylenediamine complex (Busch and Morris, J. Amer. Chem. Soc., 82, 1521, 1960), the substance being best first isolated as the iodide-

[Co 1-(pn)₂(NO₂)₂] I

The resolution is best carried out through the *levo*-ethylenediamine-tetra-acetato cobaltate (III) salt in the same manner as the resolution of [Co(en)₂C₂O₄]⁺ ion, (Dwyer, Reid and Carvan, J. Amer. Chem. Soc., 83, 1285, 1961).

(6) Oxalatobis (1-propylenediamine) cobalt (III) ion can be provided as the iodide 1.5-hydrate. Lead (IV) oxide, 10 g. was added slowly to a rapidly stirred solution, (300 ml.), at 80°, containing cobalt (II) sulfate 7-hydrate, (22.5 g.) oxalic acid 2-hydrate, (15 g.) and optically pure 1-propylenediamine, (13.0 g.). After one hour at 80°, further lead (IV) oxide, (5 g.) was added, the heating and stirring continued for a further hour, and the mixture filtered. Excess oxalic acid was neutralized by stirring with lithium carbonate, (5 g.). After filtration, barium iodide 2-hydrate, (34 g.) in hot water, (80 ml.), was added to the hot filtrate, the mixed precipitate of barium sulfate and oxalate digested at 80–90° for one hour, and then filtered off. The deep red solution deposited some of the solid substance on cooling in ice, and further fractions were obtained by evaporation. When the volume had reached 50 ml., the solution was cooled to 5° and glacial acetic acid, (5 ml.), potassium iodide, (5 g.) and 3% hydrogen peroxide, (10 ml.), were added. The dark brown crystalline salt of the tri-iodide anion was washed with ice water, dried, suspended in ethanol, and converted to the iodide by passing into the solution sulfur dioxide gas. The yield of crude product was 34.5 g. (100%). The substance could be purified by dissolution in a little hot water and then cooling at 5° for some hours, but a partial separation of the isomers occurred.

*Analysis.*—Calculated for [Co(C₃H₁₀N₂)₂C₂O₄] I.2H₂O; C, 22.30; H, 4.87; N, 12.99. Found C, 22.45; H, 4.77; N, 12.97.

*d*-Oxalatobis (1-propylenediamine) cobalt (III) iodide hydrate.—A suspension of lead *d*-bis(oxalato)ethylenediamine cobaltate (III) 3-hydrate, (25 g.), in water (300 ml.) at 70° was added to a solution of $d$-$l$-[Co($l$-pn)₂C₂O₄]

I.H₂O, (40 g.) in water (300 ml.) at 70°, and the mixture shaken until double decomposition was complete. After cooling rapidly to room temperature, the lead iodide was removed, and the filtrate concentrated at 60° in a stream of air. At intervals, the solution was cooled, and fractions of the diasteroisomer collected. The rotations of the fractions varied from −400° to +360° at 5780 mμ. The levo-rotatory fractions were reserved, the dextro-rotary ($α_{5780}+200°$) were dissolved by warming in the dextro-rotary filtrate, (50 ml.). The lead salt of the resolving agent and a little lead iodide were precipitated by the cautious addition of warm 10% lead nitrate solution, and after filtration, the excess lead ion was precipitated with dilute sulfuric acid. The partly resolved cation was recovered as the iodide by the addition of excess sodium iodide, and, after filtering, the more soluble portion in the filtrate was recovered as the tri-iodide as before. The latter salt after reduction with sulfur dioxide was added to the first portion of iodide, and the whole amount fractionally crystallized from a little hot water. The most active fraction gave $[α]_{5780}=+1010°$, and this value was not improved by fractional crystallization. Purification through the very insoluble disastereoisomer $d$-[Co 1-(pn)₂C₂O₄] $l$-[Co(en)(C₂O₄)₂] which separated on mixing warm solutions of the $d$-iodide and sodium $l$-bis (oxalato) ethylenediamine cobalt (III) was impractical because of the drastic conditions (warm 50% HI and I₂) needed to remove the resolving agent.

Bivalent cations (1) Fluoro-, or chloro-, or nitro-, or thiocyanato-amminobis (ethylenediamine) cobalt (III) ions can be provided by salts obtained from the base substance [Co(en)₂NH₃Cl] Cl₂, which is prepared by the action of concentrated ammonia on *trans* [Co(en)₂Cl₂] Cl as described by A. Werner, Liebig Annalen, 386, 1, 1912.

(2) Tris phenanthroline nickel (II) ion can be provided as follows: $d$-Tris o-phenanthroline nickel $d$-antimonyl tartrate. $d,l$ Tris o-phenanthroline nickel chloride was prepared as described by Pfeiffer and Tappermann (loc. cit.) by the addition of finely divided o-phenanthroline monohydrate (3.0 g.) to a solution of nickel chloride hexahydrate (1.2 g.) in water (100 mls.). The mixture was stirred until the phenanthroline had dissolved completely, and to the resulting red solution was added slowly a solution of potassium antimonyl tartrate (4.8 g.–3 mols) in water (30 mls.). On scratching the sides of the vessel, a pink crystalline precipitate was obtained. The solution was cooled rapidly from room temperature to approximately 5° C. in ice and filtered. The precipitate was washed with ice water and purified by solution in 0.1 N caustic soda (50 mls.) and after filtration, precipitated by the addition of acetic acid and a little potassium antimonyl tartrate. The pure substance crystallized in pale pink needles. A 0.02% solution in N/100 sodium hydroxide gave $α=+0.76°$; whence $[α]_D^{15}=+950°$.

$d$-Tris o-phenanthroline nickel perchlorate trihydrate.— The $d$-tris o-phenanthroline nickel $d$-antimonyl tartrate was dissolved in approximately N/20 caustic soda (50 mls.) by shaking at room temperature and the solution filtered. Sodium perchlorate solution was then added drop by drop, with scratching of the sides of the vessel when the $d$-perchlorate precipitated in pale pink micro crystals. After washing with ice water, the precipitate was dissolved in warm 30% acetone in water, and fractionally precipitated with sodium perchlorate. The first fraction was discarded and the more soluble fractions combined and recrystallized from aqueous acetone by the addition of sodium perchlorate. The substance crystallized in flat pink plates and was appreciably soluble in cold water to give a pink solution. A 0.02 solution in water gave $α_D=+1.17°$ and $α_{5461}=+1.39°$, whence $[α]_D^{15}=+1463°$ and $[α]_{5461}^{15}=+1738°$; or $[M]_D^{15}=12,470°$ and $$[M]_{5461}^{15}=14,810°$$

$l$-Tris o-phenanthroline nickel perchlorate trihydrate.— The residual solution after the precipitation with potassium antimonyl tartrate was strongly levo-rotatory and was treated carefully with sodium perchlorate solution, avoiding an excess to prevent the precipitation of potassium perchlorate. Alternatively it was treated with sodium iodide solution and the insoluble iodide dissolved in aqueous acetone and then precipitated as the perchlorate. The perchlorate precipitate was recrystallized as for the $d$ form above, and gave flat pink plates of the pure levo-perchlorate.

Occasionally this substance appeared in a yellow dimorphous form if the aqueous acetone solution was too hot. The yellow form gave a pink solution in water and had the same rotation as the pink form. A 0.02% solution in water gave $\alpha_D = 1.17°$ and $\alpha_{5461} = -.30°$ whence $[\alpha]_D^{15} = -1463°$ and $[\alpha]_{5461}^{15} = -1738°$; or $$[M]_D^{15} = 12,470°$$

and $[M]_{5461}^{15} = -14,810°$.

Trivalent cations (1) Tris (ethylenediamine) cobalt (III) ion can be provided by the reactions described by Broomhead, Dwyer, Hogarth, Inorganic Synthesis vol. VI p. 183–5, as follows:

$4CoSO_4 + 12en + 4HCl + O_2 \rightarrow 4[Co(en)_3]ClSO_4$
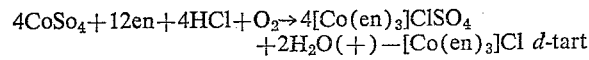
$[Co(en)_3]ClSO_4 + Ba$ $d$-tart $\rightarrow (-) - Co(en)_3Cl$ $d$-tart wherein en is ethylenediamine, and $d$-tart is the *dextro*-tartrate radical. Thus, a 500 ml. filter flask is fitted with a rubber stopper carrying an open glass tube extending to the bottom of the flask, and 20.4 ml. of 88.6% w./v. ethylenediamine (0.3 mol) is added. This is diluted with water (50 ml.) the mixture is cooled in ice and 10 ml. of 10 N hydrochloric acid added. Cobalt (II) sulfate 7-hydrate (28.1 g., 0.1 mol), dissolved in cold water (50 ml.) is then added, and finally activated charcoal (4 g.). A rapid current of air is passed into the solution for four hours. At the end of this time the pH of the mixture is adjusted by the addition of a few drops of either dilute hydrochloric acid or ethylenediamine into the range pH 7.0 to 7.5. The mixture is heated in an evaporating dish on the steam bath for 10 to 15 minutes to complete the reaction, cooled, and the charcoal filtered off. The charcoal is washed with 20 ml. of water.

Barium $d$-tartrate (0.1 mol) is added and the mixture heated on the steam bath with good mechanical stirring for about half hour. The barium sulfate is filtered off and washed with a little hot water and the orange-red filtrate is evaporated to a volume of 60 ml. Crystallization of (+)-tris (ethylenediamine) cobalt (III) chloride $d$-tartrate 5-hydrate ensues on cooling and is completed by allowing to stand overnight. The crystals are filtered off and the filtrate reserved for the isolation of the levo-isomer. The crystals are washed with 40% ethanol-water and recrystallized by dissolving in 30 to 32 ml. of hot water, following by cooling to room temperature and then in ice. After filtration the crystals are washed with 40% ethanol-water, then with absolute ethanol, and air-dried. The yield of the optically pure isomer, $$[\alpha]_D = +102°$$

is 21 g.

Dextro-iodide.—The chloride $d$-tartrate is dissolved in 30 ml. of hot water; concentrated ammonia solution (0.5 ml.) is then added, followed with stirring by 35 g. of sodium iodide dissolved in 15 ml. of hot water. The iodide crystallizes as reddish-orange needles on cooling in ice for 15 minutes. After filtration the crystals are sucked very dry and washed with ice-cold 30% sodium iodide (20 ml.) to remove tartrate and then with ethanol and acetone. The yield of the air-dried product $[\alpha]_D = +89°$, is 24 g. (35%).

Levo-iodide.—The levo-tris (ethylenediamine) cobalt (III) chloride $d$-tartrate remaining in the solution above is treated with concentrated ammonia solution (0.5 ml.) and the mixture is heated to about 80° C. Solid sodium iodide (35 g.) is stirred in and the whole cooled in ice. The impure levo-iodide is filtered off and washed with ice-cold 30% sodium iodide (25 ml.) and then with alcohol and air-dried, resulting in a yield of 27 g. Purification is effected by stirring the whole of the crude material into 65 ml. of water to 50° C. The racemate remains undissolved and is filtered off. Sodium iodide (10 g.) is added to the warm filtrate (50° C.) and crystallization allowed to take place. After cooling in ice the solid is filtered, washed with ethanol and then acetone, and air-dried. The yield is 18 g. (26%), and $[\alpha]_D = -90°$.

(2) Tris (1-propylenediamine) cobalt (III) ion can be provided as described by F. P. Dwyer, F. L. Garvan and A. Shulman, J.A.C.S. 81 290 (1959), involving resolution of $d,l$ - $[Co(d,l\text{-pn})_3]_3 \cdot H_2O$ to yield the isomers D-$[Co(d\text{-pn})_3]I_3 \cdot H_2O$ and L-$[Co(l\text{-pn})_3]I_3 \cdot H_2O$. Thus, a solution (1 liter) of D,L-$[Co(d,l\text{-pn})_3]_2(SO_4)_3$ was prepared by the air oxidation of cobalt (II) sulfate 7-hydrate, (45 g.) technical propylenediamine (48 ml.), sulfuric acid (16.4 ml. 10 N) and charcoal (10 g.). The charcoal was removed after 10 hr., the solution heated to 90° C. and barium iodide 2-hydrate (100 g.) added. After digestion, the barium sulfate was removed and the filtrate evaporated to 500 ml. on the steam-bath. The orange-yellow iodide separated on cooling and was recrystallized three times from the minimum volume of water at 90° C. followed by cooling to 20° C. This substance was substantially the racemic form of the D-*ddd* and L-*lll* isomers. The other isomers remained in solution.

Dextro-isomer.—The racemate (22.5 g.) in water (200 ml.) was transformed to the chloride by shaking with silver chloride. After filtration and washing of the silver halide precipitate, silver $d$-tartrate (12.1 g.) was added to the filtrate and vigorously shaken at 80° C. The silver halide was removed, washed with hot water and the filtrate and wash liquid evaporated to a thick syrup. Acetone (500 ml.) was added whereupon the mixed chloride $d$-tartrates crystallized. The solid was washed with acetone and dried in the oven at 70° C. It then was dissolved in ethylene glycol (100 ml.) by warming and stirring. On cooling and scratching the sides of the vessel the D-diastereoisomer crystallized in very fine yellow needles. The crystals were washed with 50 methanol-ethylene glycol, then with methanol and acetone. After separation of most of the D-diastereoisomer in this way, the substance could be crystallized easily from water by the addition of half the volume of methanol.

*Analysis.*—Calculated for $[Co(C_3H_{10}N_2)_2]I_3 \cdot H_2O$: C, 15.9; H, 4.74; N, 12.40. Found: C, 16.12; H, 4.75; N, 12.47.

Levo-isomer.—The same procedure as above, using silver $l$-tartrate, was employed. The iodide had $[\alpha]_D -24°$, $[\alpha]_{5461} -184°$, and the recovered $l$-propylenediamine gave $[\alpha]_D -34.8 \pm 0.7°$.

*Analysis.*—Calculated for $$[Co(C_4H_{10}N_2)_3Cl \cdot C_4H_4O_6 \cdot 3H_2O]$$

Found: C, 30.30; H, 7.34. Calculated for $$[Co(C_3H_{10}N_2)_3]I_3 \cdot H_2O$$

Found: C, 16.16; H, 4.50; N, 12.54.

(3) Aquo-amino bis (ethylenediamine) cobalt (III) ion can be provided as follows: The optically active forms can be prepared from cis$[Co(en)_2NH_3Br]^{2+}$ (Werner, Ber., 44, 1887, 1911). The Br atom comes off upon allowing the substance to stand in warm water, and is replaced by $H_2O$ (i.e., an aquo group). The replacement occurs with retention of the optical activity.

We claim:

1. The method of resolving a racemic amino acid which comprises blocking the amino group by reaction with an acid selected from the group consisting of formic, acetic, benzoic, phthalic, p-nitrobenzoic and p-toluenesulfonic, neutralizing the mixture with an alkali metal hydroxide to form an aqueous solution, reacting the resulting solution with an optically active metal complex selected from the group consisting of (cobalt-dinitroethylenediamine) acetate, (cobalt dinitroethylenediamine)bromide, and (cobalt oxaloethylenediamine) bromide, separating the resulting precipitate, and treating the precipitate with an alkali metal iodide, separating the solid metal complex and recovering the amino acid from the solution.

2. The method of resolving a racemic amino acid of the class consisting of alanine, valine, leucine, serine, cystine, phenylalanine, tyrosine and glutamic acid which comprises blocking the amino group with an acid selected from the group consisting of p-toluenesulfonic, p-nitrobenzoic, phthalic, benzoic, acetic and formic acid, neutralizing the reaction mixture with an alkali metal hydroxide, reacting the resulting aqueous solution with d-(cobalt-dinitroethylenediamine) acetate, treating the precipitate with potassium iodide, separating d-(cobalt-dinitroethylenediamine)iodide and recovering the amino acid from the solution.

3. The method of resolving a racemic N-benzoyl valine which comprises treating it in an aqueous solution of potassium hydroxide, and then with l-(cobalt-dinitroethylenediamine) acetate, cooling the mixture to precipitate benzoyl-d-valine-l-(cobalt - dinitroethylenediamine), treating the resulting product with aqueous potassium iodide, separating the resulting l-(cobalt-dinitroethylenediamine) iodide, and acidifying the solution with HCl to recover benzoyl-d-valine.

4. The method of resolving a racemic N-phthaloyl leucine which comprises treating it in an aqueous solution of potassium hydroxide, and then with l-(cobalt-dinitroethylenediamine) acetate, cooling the mixture to precipitate N-phthaloyl-d-leucine-l-(cobalt - dinitroethylenediamine), treating the resulting product with aqueous potassium iodide, separating the resulting l-(cobalt-dinitroethylenediamine) iodide, and acidifying the solution with HCl to recover N-phthaloyl-d-leucine.

5. The method of resolving a racemic N-tosyl serine which comprises treating it in an aqueous solution of potassium hydroxide, and then with l-(cobalt-dinitroethylenediamine) acetate, cooling the mixture to precipitate N-tosyl-d-serine-l-(cobalt-dinitroethylenediamine), treating the resulting product with aqueous potassium iodide, separating the resulting l-(cobalt-dinitroethylenediamine) iodide, and acidifying the solution with HCl to recover N-tosyl-d-serine.

6. The method of resolving a racemic N-formyl cystine which comprises treating it in an aqueous solution of potassium hydroxide, and then with l-(cobalt-dinitroethylenediamine) acetate, cooling the mixture to precipitate N-formyl-d-cystine-l-(cobalt-dinitroethylenediamine), treating the resulting product with aqueous potassium iodide, separating the resulting l-(cobalt-dinitroethylenediamine) iodide, and acidifying the solution with HCl to recover N-formyl-d-cystine.

7. The method of resolving a racemic N-benzoyl alanine which comprises treating it in an aqueous solution of potassium hydroxide, and then with l-(cobalt-dinitorethylenediamine) acetate, cooling the mixture to precipitate N-benzoyl-d-alanine-l-(cobalt - dinitroethylenediamine), treating the resulting product with aqueous potassium iodide, separating the resulting l-(cobalt-dinitroethylenediamine) iodide, and acidifying the solution with HCl to recover N-benzoyl-d-alanine.

8. The method of resolving a racemic N-formyl tyrosine which comprises treating it in an aqueous solution of potassium hydroxide, and then with l-(cobalt-dinitroethylenediamine) acetate, cooling the mixture to precipitate N-formyl-d-tyrosine-l-(cobalt-dinitroethylenediamine), treating the resulting product with aqueous potassium iodide, separating the resulting l-(cobalt-dinitroethylenediamine) iodide, and acidifying the solution with HCl to recover N-formyl-d-tyrosine.

9. The method of resolving a racemic N-carboxy-benzoyl alanine which comprises treating it in an aqueous solution of potassium hydroxide, and then with l-(cobalt-dinitroethylenediamine) acetate, cooling the mixture to precipitate N-carboxybenzoyl-d-alanine-l-(cobalt-dinitroethylenediamine), treating the resulting product with aqueous potassium iodide, separating the resulting l-(cobalt-dinitroethylenediamine) iodide, and acidifying the solution with HCl to recover N-carboxybenzoyl-d-alanine.

References Cited

Gott et al., Jour. Amer. Chem. Soc., vol. 74, pp. 4820–22 (1952).

Das Sarma et al., Jour. Amer. Chem., Soc., vol. 77, pp. 5480–82 (1955).

Das Sarma et al., Jour. Amer. Chem. Soc., vol. 78, pp. 895–97 (1956).

Murakami et al., Nippon Kagazu Zasshi (Jour. Chem. Soc. of Japan), vol. 83, pp. 734–7 (June 1962).

LORRAINE A. WEINBERGER, *Primary Examiner.*

N. S. RIZZO, *Examiner.*

N. TROUSOF, L. A. THAXTON,
*Assistant Examiners.*